2,748,083
POLYMERIZATION PROCESS

William C. Hollyday, Jr., Fanwood, Thomas S. Tutwiler, Watchung, and Carol F. Ford, Eatontown, N. J., assignors to Esso Research and Engineering Company, a corporation of Delaware No Drawing. Application November 30, 1953, Serial No. 395,296

5 Claims. (Cl. 252—51.5)

This invention relates to lubricating oil additive materials and to the process for their preparation. Particularly the invention relates to lubricating oil additives that have the desirable characteristic of improving the viscosity index of lubricating oils with which they are blended and to an improved process for their preparation. Still more particularly the invention relates to an improved process for the preparation of polymers and copolymers of vinyl ether viscosity index improvers which comprises the use of phenyl alpha-naphthylamine as a polymerization catalyst in the presence of heat.

The concept of improving the rate of change of viscosity of the lubricating oil with a temperature change by the addition of viscosity index improvers is known in the art. Materials such as polyacrylates, polymethacrylates, polymerized isobutylene etc. are well known for this purpose and are disclosed in some detail in the patent literature.

For some purposes, however, these known viscosity index improvers have an undesirable property of unduly increasing the viscosity of a lubricating oil while the viscosity-temperature relationship is being improved. It is desirable that the rate of change of viscosity with temperature, generally referred to as the viscosity index of an oil, be improved without unduly increasing the viscosity of the composition.

It is known in the art of lubricant additive manufacture that polymers and copolymers of materials such as vinyl ethers, substantially improve the viscosity index of a lubricating oil when added thereto. U. S. Patents 2,020,714 and 2,016,490 disclose the use of copolymers of various vinyl or substituted vinyl ethers with other vinyl compounds.

It has recently been found, and forms the subject of copending application, Serial Number 198,475, that new and useful vinyl ether polymers may be prepared by copolymerizing with at least one alkyl vinyl ether, an alkoxy vinyl ether as described below.

These new and improved viscosity index improvers of the copending application are prepared by copolymerizing, in the presence of a Friedel-Crafts catalyst, an alkoxy vinyl ether having the general formula

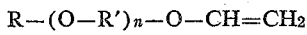

wherein R is an alkyl group containing from 1 to 20 carbon atoms, R' is a bivalent radical selected from the group consisting of methylene, ethylene, propylene, and butylene, and $n$ is an integer from 1 to 2 with at least one alkyl vinyl ether having the general formula

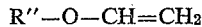

wherein R' is an alkyl group containing from 1 to 20 carbon atoms, R, R', and R" being chosen so that the average of R+$n$R' and R" in the resulting copolymer is at least 4 carbon atoms when $n=1$, at least 6 when $n=2$, and at least 8 when $n=3$.

Among the alkoxy vinyl ethers that are operable for the formation of these copolymeric materials may be mentioned 2-methoxy ethyl vinyl ether, 2-ethoxyethyl vinyl ether, 3-ethoxy propyl-1 vinyl ether, 2-butoxy ethyl vinyl ether, 2-butoxy 2-methyl ethyl vinyl ether, 2-isopropoxy 2-methyl ethyl vinyl ether, 2-propoxy 3-butyl ethyl vinyl ether, 2-octyloxy ethoxy-ethoxy ethyl vinyl ether, hexadecyloxy ethoxy ethyl vinyl ether, 2-(2-ethylhexyloxy) ethoxy ethyl vinyl ether, 2-(2-ethoxy ethyoxy) ethyl vinyl ether, 2-(2-butoxy ethoxy) ethyl vinyl ether, and the like. The alkyl vinyl ethers which are suitable include vinyl isobutyl ether, vinyl 2-ethyl hexyl ether, vinyl methyl ether, vinyl Lorol B ether, vinyl octadecyl ether, etc.

In the preparation of these copolymeric viscosity index improvers the alkoxy vinyl ether and the alkyl vinyl ether may be reacted in ratios of from 1 to 60% by weight of the alkoxy vinyl ether with from 99% to 40% by weight of the alkyl vinyl ether. It is preferred that the ratio of the monomers be adjusted so that from 10% to 50% of the alkoxy vinyl ethers is copolymerized with from 90% to 50% of the alkyl vinyl ether.

Although the carbon chain length of the alkyl substituent group of the alkoxy vinyl ether may vary from 1 to 20 carbon atoms and of the alkyl vinyl ether from 1 to 20 carbon atoms, it is preferred that the alkyl substituent be selected so that the final copolymeric product has an average side chain length of from about 3 to about 8 carbon atoms, preferably from 4 to 6 carbon atoms.

It is preferred that the molecular weight of the polymeric materials of the invention average between 8,000 and 30,000 Staudinger.

To prepare these copolymers, the monomeric materials are copolymerized in the presence of a Friedel-Crafts catalyst. Such catalysts as gaseous $BF_3$, $BF_3$ etherates, $AlCl_3$, $SnCl_4$, $ZnCl_2$ may be used as well as other ionic type catalysts such as acids, etc.

The copolymerization is carried out preferably by the bulk polymerization technique, utilizing diluents such as hydrocarbon and/or halogenated hydrocarbons to influence molecular weight control and to facilitate handling of the polymeric material.

Temperatures between a range of from 0° C. to −100° C. are operable, −70° C. to −80° C. being especially preferred. Internal coolants such as ethylene, Dry Ice, methyl chloride, etc., may be used to remove the heat of polymerization.

Although the above ranges of process limitations are operable in the preparation of the vinyl ether polymeric materials a preferred method involves the admixture of the monomers in a solvent such as methyl chloride and polymerization with boron fluoride catalyst, Dry Ice being added as a refrigerant. The polymer is then ordinarily precipitated and washed with an alcohol and then dissolved in a solvent such as hexane. The solution of the polymer may then be washed with an alkaline agent and dried. Ordinarily the solvent is evaporated leaving behind the polymeric material in the form of a viscous liquid. A blend of the polymeric material is ordinarily made using a mineral oil as a solvent. The blend, usually in concentrated form, i. e., 20 wt. percent to about 60 wt. percent, is used to prepare the final blends with additional lubricating oil, the finished lubricant containing from about 0.01% to about 10.0% by weight, based on the weight of the total composition, of the polymeric material.

It has been found in the past that when the polymeric vinyl ethers are blended with a mineral lubricating oil to prepare the concentrate as described above, they tend to breakdown in molecular weight slightly. This tendency is, of course, undesirable, since their effectiveness as viscosity index improvers is directly proportional to molecular weight, other things being equal.

It has now been found, and forms the object of this invention, that this tendency to decrease in molecular weight may be overcome, and in addition, the molecular weight of the polymeric materials may be increased by an additional treatment of the oil concentrate of the polymeric materials which comprises the addition of a minor proportion of phenyl alpha-naphthylamine and raising the temperature of the mixture to one within the range of about 150° F. to about 250° F. This discovery is surprising and unexpected, since other well known antioxidants give an entirely opposite effect, their use as polymerization inhibitors having been long known to the art.

The invention will be more clearly explained by reference to the following examples, which are of an illustrative nature only, and are not limiting of the inventive concept.

*Example 1.—Preparation of vinyl ether copolymer by prior art method*

A mixture of 50.4 parts of butoxyethyl vinyl ether, 17.2 parts of isobutyl vinyl ether, and 32.4 parts of 2-ethylhexyl vinyl ether in one volume of methyl chloride was polymerized with gaseous boron trifluoride catalyst. Dry Ice was used as a refrigerant and the temperature was maintained at about −70° C. to −80° C. The polymer was precipitated and washed with methanol, and then dissolved in hexane. The hexane solution was washed with sodium carbonate solution and dried over calcium sulfate.

*Examples 2–8*

The hexane solution of the polymeric material prepared as described above was divided into seven equal portions. One portion was used as a control and into the six other portions various amounts of different antioxidants were added. The hexane solutions were then evaporated and the last traces of hexane removed in a vacuum oven at 160° F. for four hours.

The polymeric materials containing the antioxidants and the control sample were then blended with an extracted Mid-Continent base stock having a viscosity of 5.1 centistokes at 210° F. to 40% concentrates. The blends were then subjected to a heating treatment to test the stability of the copolymeric materials in the oil blends. The results of these treating steps are set out in Table I below.

TABLE I.—POLYMERIZATION OF VINYL ETHERS IN PRESENCE OF ANTIOXIDANTS

| Ex. No. | | Temp., °F. | Blend Viscosity [1] | | Percent Change in Mol Weight by Treatment |
|---|---|---|---|---|---|
| | | | 0 days | 20 days | |
| 1 | Theoretical Stable Product | 210 | | | 0.0 |
| 2 | No Antioxidant | 210 | 390.5 | 294.5 | −24.3 |
| 3 | 2,4 Di-t-Octyl Phenol (1%) | 210 | 430.1 | 407.8 | −5.7 |
| 4 | 2,6 Di-t-Butyl p-Cresol (1%) | 210 | 430.5 | 389.7 | −10.3 |
| 5 | Di-t-Amyl Hydroquinone (1%) | 210 | 422.8 | 343.2 | −20.7 |
| 6 | Phenyl alpha-naphthylamine (0.5%) | 210 | 439.9 | 580.0 | +36.5 |
| 7 | Phenyl alpha-naphthylamine (1.0%) | 210 | 410.6 | 575.0 | +42.4 |
| 8 | Phenyl alpha-naphthylamine (1.0%) | 70 | 405.0 | 404.8 | 0.0 |

[1] Viscosity in cs. of 40% of copolymer in an extracted Mid-Continent base having a viscosity of 5.1 cs. at 210° F.

It will be seen that the heat treatment reduced the viscosity of the blend containing no antioxidant over 24%. The same treatment of blends containing the antioxidants of the prior art decreased the viscosity from about 5% to more than 20%. However, when the phenyl alpha-naphthylamine of the invention was used, the viscosity of the blend increased about 40%, indicating that the combination of the phenyl alpha-naphthylamine and the heat treatment actually continued the polymerization of the polymeric material, a result which is surprising and unexpected. Example 8, treated at 70° F., did not change in viscosity, indicating that this temperature was not sufficiently high to obtain the desired result.

To recapitulate briefly, the instant invention relates to an improved process for the preparation of vinyl ether polymeric materials useful as viscosity index improvers which comprise an additional treating step wherein the polymerized materials are further polymerized in the presence of phenyl alpha-naphthylamine.

What is claimed is:

1. In a process for the preparation of lubricating oil additive materials having the desirable characteristic of improving the viscosity index of lubricating oils into which they have been incorporated which comprises copolymerizing a vinyl alkoxy ether having the general formula $$R\text{---}(O\text{---}R')_n\text{---}O\text{---}CH=CH_2$$

wherein R is an alkyl group containing from 1 to 20 carbon atoms, R' is a bivalent radical chosen from the group consisting of methylene, ethylene, propylene and butylene, and n is an integer from 1 to 3 with a vinyl alkyl ether having the general formula $$R''\text{---}O\text{---}CH=CH_2$$

wherein R'' is an alkyl group containing from 1 to 20 carbon atoms, R, R', and R'' being chosen so that the average of R+nR' and R'' in the resulting copolymer is at least 4 carbon atoms when n=1, at least 6 carbon atoms when n=2, and at least 8 carbon atoms when n=3, the improvement which comprises adding a relatively minor proportion of phenyl alpha-naphthylamine to a lubricating oil solution of said copolymer and raising to a temperature of about 150° to 250° F. to further polymerize said copolymer.

2. In a process for the preparation of lubricating oil additive materials having the desirable characteristic of improving the viscosity index of lubricating oils into which they have been incorporated which comprises copolymerizing from 1% to 60% by weight of an alkoxy vinyl ether having the general formula $$R\text{---}(O\text{---}CH_2\text{---}CH_2)_n\text{---}O\text{---}CH=CH_2$$

wherein R is an alkyl group containing from 1 to 20 carbon atoms and n is an integer from 1 to 3 with from 99% to 40% by weight of at least one alkyl vinyl ether having the general formula $$R'\text{---}O\text{---}CH=CH_2$$

wherein R' is an alkyl group containing from 1 to 20 carbon atoms in the presence of a halogenated hydrocarbon diluent and a Friedel-Crafts catalyst at a temperature within the range of from 0° C. to −100° C. for a period of time sufficient to give a polymeric material having a molecular weight within a range of from 8,000 to 30,000 Staudinger, the improvement which comprises adding a relatively minor proportion of phenyl alpha-naphthylamine to a lubricating oil solution of said copolymer and raising to a temperature of about 150° F. to 250° F. to further polymerize said copolymer.

3. In a process for the preparation of lubricating oil additive materials having the desirable characteristic of improving the viscosity index of lubricating oils into which they have been incorporated which comprises copolymerizing from 10% to 50% by weight of an alkoxy vinyl ether having the general formula $$R\text{---}(O\text{---}CH_2\text{---}CH_2)_n\text{---}O\text{---}CH=CH_2$$

wherein R is an alkyl group containing from 1 to 4 carbon atoms and n is an integer from 1 to 2 with from 90% to 50% by weight of an alkyl vinyl ether having the general formula $$R'—O—CH=CH_2$$

wherein R is an alkyl group containing from 1 to 20 carbon atoms in the presence of a diluent and a Friedel-Crafts catalyst at a temperature within the range of from 0° C. to —100° C. for a period of time sufficient to give a polymeric material having a molecular weight of within a range of from 12,000 to 22,000 Staudinger, the improvement which comprises adding a relatively minor proportion of phenyl alpha-naphthylamine to a lubricating oil solution of said copolymer and raising to a temperature of about 150° F. to 250° F. to further polymerize said copolymer.

4. A process for the preparation of lubricating oil additive materials having the desirable characteristic of improving the viscosity index of lubricating oils into which they have been incorporated which comprises copolymerizing from 10% to 50% by weight of a butoxy ethyl vinyl ether with from 90% to 50% by weight of an alkyl vinyl ether having from 6 to 10 carbon atoms per molecule at a temperature within a range of from —70° C. to —80° C. in the presence of BF$_3$ as a catalyst and methyl chloride as a diluent for a period of time sufficient to give a polymeric material having a molecular weight of from 12,000 to 22,000 Staudinger, the improvement which comprises adding a relatively minor proportion of phenyl alpha-naphthylamine to a lubricating oil solution of said copolymer and raising to a temperature of about 150° F. to 250° F. to further polymerize said copolymer.

5. A process for the preparation of lubricating oil additive materials having the desirable characteristic of improving the viscosity index of lubricating oils into which they have been incorporated which comprises copolymerizing about 50 parts by weight of a butoxy ethyl vinyl ether with about 32 parts by weight of an alkyl vinyl ether having from 6 to 10 carbon atoms per molecule and about 18 parts by weight of isobutyl vinyl ether at a temperature within a range of from —70° C. to —80° C. in the presence of BF$_3$ as a catalyst and methyl chloride as a diluent for a period of time sufficient to give a polymeric material having a molecular weight of from 12,000 to 22,000 Staudinger, the improvement which comprises adding a relatively minor proportion of phenyl alpha-naphthylamine to a lubricating oil solution of said copolymer and raising to a temperature of about 150° F. to 250° F. to further polymerize said copolymer.

References Cited in the file of this patent
UNITED STATES PATENTS

| | | |
|---|---|---|
| 2,020,703 | Schumann et al. | Nov. 12, 1935 |
| 2,020,714 | Wulff et al. | Nov. 12, 1935 |
| 2,264,896 | Bahlke | Dec. 2, 1941 |
| 2,271,940 | James et al. | Feb. 3, 1942 |